United States Patent [19]
Le Dû

[11] Patent Number: 5,911,468
[45] Date of Patent: Jun. 15, 1999

[54] CLAMP AND METHOD FOR PROVIDING A CLAMP FORMED FROM A VEHICLE BODY OR DOOR PANEL

[75] Inventor: Pierre Le Dû, Chavagne, France

[73] Assignees: Automobiles Peugeot, Paris, France; Automobiles Citroen, Neuilly Sur Sein, France

[21] Appl. No.: 08/700,376

[22] PCT Filed: Dec. 22, 1995

[86] PCT No.: PCT/FR95/01731

§ 371 Date: Oct. 17, 1996

§ 102(e) Date: Oct. 17, 1996

[87] PCT Pub. No.: WO96/20349

PCT Pub. Date: Jul. 4, 1996

[30] Foreign Application Priority Data

Dec. 27, 1994 [FR] France ................................. 94 15720

[51] Int. Cl.⁶ ................................................ B60J 7/00
[52] U.S. Cl. ...................... 296/208; 248/49; 248/74.2; 296/146.1
[58] Field of Search ........................ 248/49, 74.1, 74.2; 296/208, 148.1, 146.7, 152, 146.1

[56] References Cited

U.S. PATENT DOCUMENTS

| | | |
|---|---|---|
| 1,654,756 | 1/1928 | Ryan .................................. 248/74.2 X |
| 1,860,861 | 5/1932 | Knutson . |
| 2,578,639 | 12/1951 | Bedford, Jr. . |
| 3,905,070 | 9/1975 | Macrae . |
| 4,461,387 | 7/1984 | Belokin, Jr. . |
| 4,527,759 | 7/1985 | Dorner et al. ...................... 248/74.2 X |
| 4,671,537 | 6/1987 | Yoshitsugu .......................... 248/74.2 X |
| 5,092,647 | 3/1992 | Ueda et al. .......................... 296/208 X |

*Primary Examiner*—Derek J. Berger
*Attorney, Agent, or Firm*—Pennie & Edmonds LLP

[57] ABSTRACT

A clamp-like device for the fastening of an element to a metal sheet part of a vehicle, comprising a tongue directly cut out in the metal sheet of the vehicle part and suitably shaped in accordance with the element to be held, the device being applicable to an automotive vehicle and in particular to the fastening of electric cable or piping harnesses.

17 Claims, 2 Drawing Sheets

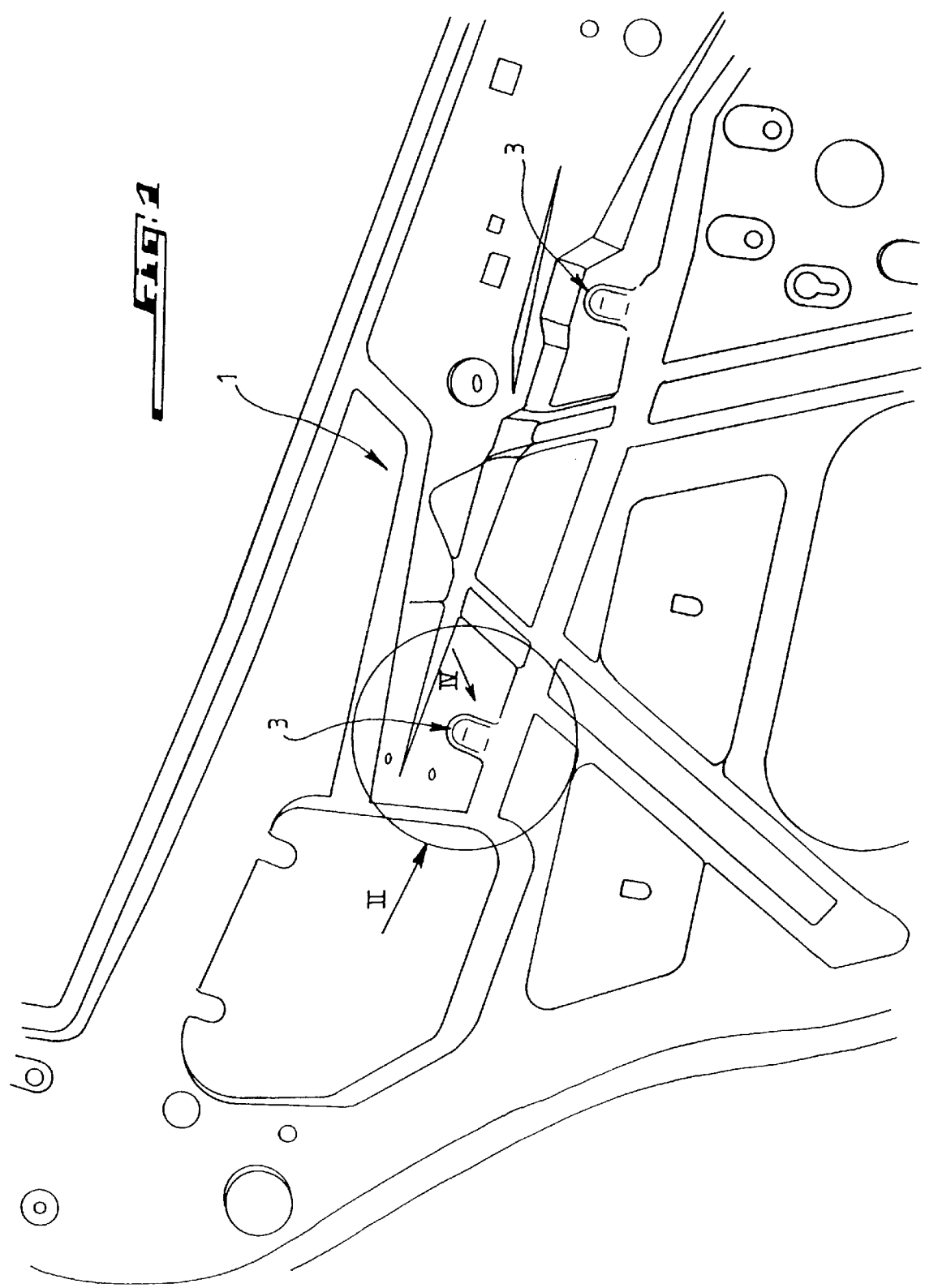

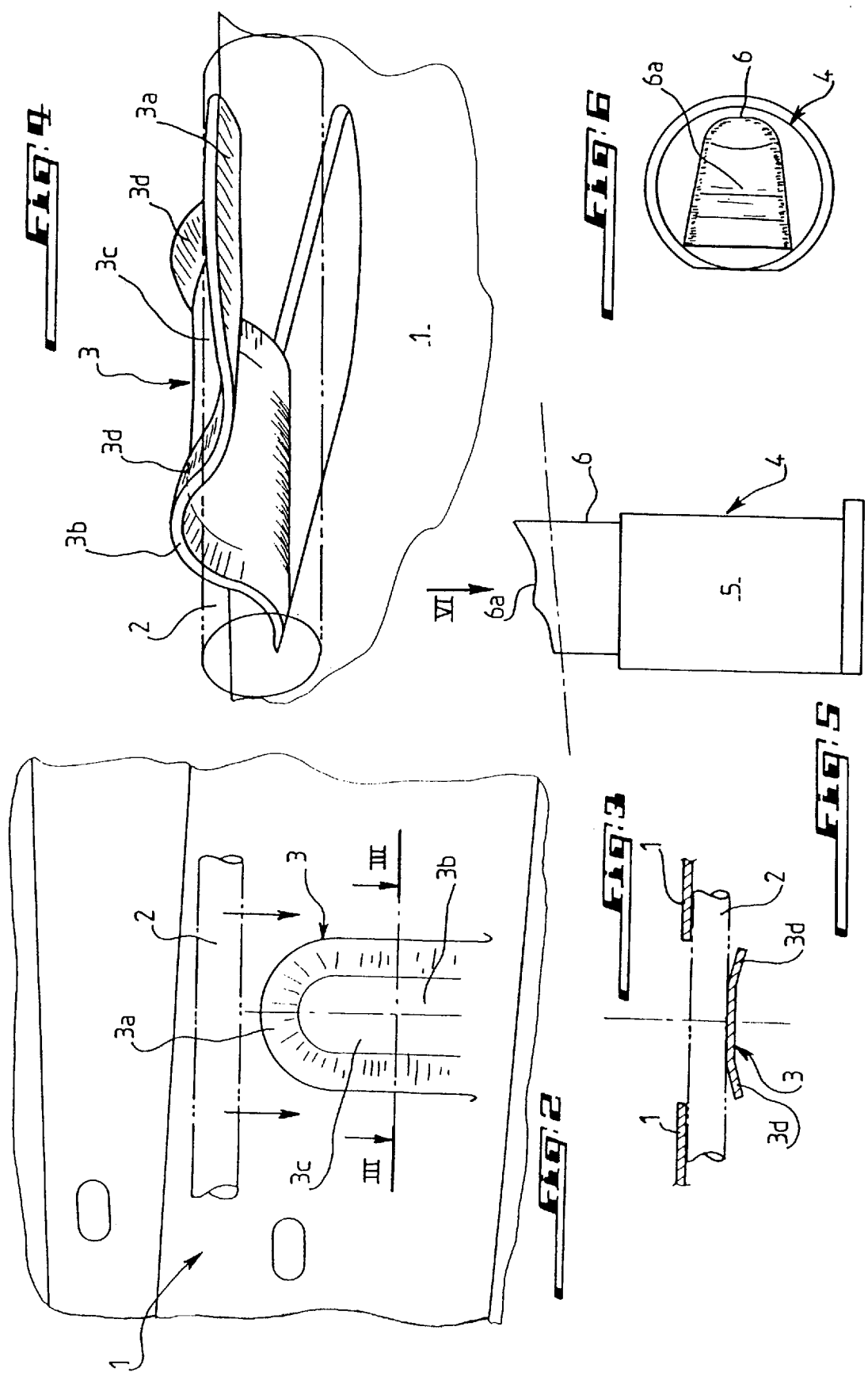

CLAMP AND METHOD FOR PROVIDING A CLAMP FORMED FROM A VEHICLE BODY OR DOOR PANEL

BACKGROUND OF THE INVENTION

The present invention relates to a device forming a clamp or clip for the fastening of an element to a metal sheet portion of an automotive vehicle as well as a method of making such a device.

Such devices intended in particular for holding electric cable or wiring harnesses or piping elements upon metal sheet portions of doors of an automotive vehicles are known.

These known fastening devices consist generally of clamps or clips made from plastics material and secured to the metal sheet support portion but which are arranged in such a manner that they require a not negligible laying time. Moreover the cost of these known clamps or clips is variable according to the complexity of the element to be held.

SUMMARY OF THE INVENTION

The present invention provides a device forming a clamp or clip removing the inconveniences referred to hereinabove of the known devices.

For that purpose according to the invention, the device forming a clamp or clip for the fastening of an element such as an electric cable or wiring harness to a metal sheet part of an automotive vehicle is characterized in that it comprises a blade or tongue directly cut in the metal sheet of the vehicle part and shaped as desired in accordance with the element to be held.

Preferably the blade or tongue comprises a flared portion for the insertion of the element to be held, a portion for accommodating the element and a concave portion between the flared and accommodating portions to hold the element in the accommodating portion.

Advantageously the side edges of the tongue are bent in a direction opposite to the metal sheet part in order to avoid damaging the element during its insertion into the corresponding accommodating portion of the tongue.

The invention also provides a method of making the device forming a clamp or clip such as previously defined and which consists in partially cutting out the metal sheet of the vehicle part and then in stamping and shaping the precut tongue in at least one operation.

If need be, the aforesaid steps for making the tongue are effected in one single operation.

BRIEF DESCRIPTION OF THE DRAWINGS

The invention will be better understood and further objects, characterizing features, details and advantages thereof will appear more clearly in the following explanatory description made with reference to the attached diagrammatic drawings given by way of non limiting example only illustrating one presently preferred specific embodiment of the invention and in which:

FIG. 1 is a perspective view of a metal sheet part of a door of an automotive vehicle showing the locations of the clamp-like devices according to the invention;

FIG. 2 is an enlarged view of the portion circled at II of FIG. 1;

FIG. 3 is a view in section taken upon the line III—III of FIG. 2;

FIG. 4 is a perspective view according to the arrow IV of FIG. 1;

FIG. 5 shows a stamping punch assembly usable for making a clamp or clip of the invention; and FIG. 6 is a top view according to the arrow VI of FIG. 5.

DETAILED DESCRIPTION OF THE INVENTION

Referring to the figures, the reference numeral 1 designates the inner metal sheet part of a rear door of an automotive vehicle upon which should be fixedly held at least one element 2 such for example as an electric cable or wiring harness or a piping element.

The element 2 is secured to the metal sheet part 1 by clamps or clips which according to the invention consists each one of a tongue or strip 3 directly cut out in the metal sheet of the part 1 and shaped as desired in accordance with the type of element 2 to be held.

As shown in particular on FIG. 4, the tongue 3 comprises a flared free end portion 3a permitting the insertion of the corresponding portion of the element 2 to be fastened between the tongue 3 and the corresponding metal sheet wall; a convex portion 3b for accommodating the element 2 and a concave portion 3c located between the flared portion 3a and the accommodating portion 3b for holding the element 2 in the accommodating portion 3b.

In order to avoid damaging the element 2 by the cut side edges 3d of the tongue 3, these edges are bent in a direction opposite to the metal sheet part 1.

The positioning of the element 2 into each holding clamp already results from the foregoing description and will now be explained.

The element 2 to be held is positioned in relation to the tongue 3 as shown on FIG. 2 and displaced in the direction shown by the arrows on this figure to bring the element underneath the flared portion 3a of the tongue 3. By pushing in the direction of these arrows, the tongue 3 is elastically moved away from the metal sheet part 1 by the force exerted by the element 2 upon the concave portion 3c of the tongue 3 and the element 2 is then inserted into the corresponding holding portion 3b of this tongue. The tongue 3 returns substantially to its initial position so that the concave portion 3c holds the element 2 in the accommodating portion 3b.

The method of making each fastening clamp is as follows.

At the suitable locations of the metal sheet part 1 of the vehicle door, the metal sheet of this part is partially cut out so as to form a tongue or blade 3 which is then stamped with the assistance of a stamping tool and shaped in one or several operating steps for achieving the tongue configuration previously described. The complete manufacture of a tongue may possibly be carried out in one single stamping operation.

FIGS. 5 and 6 show a stamping punch 4 permitting the shaping of a tongue 3 after having carried out a simple cutting of the latter with the assistance of a suitable tool. The punch 4 comprises a generally cylindrical portion 5 extended by an end portion 6 comprising the impression 6a for shaping a tongue 3 such as that shown on FIG. 4. The chain-dotted line symbolically represents the digitalized face or face used as a reference for one of the two sides of the metal sheet, namely in the present case the side or face turned towards the passenger compartment of the vehicle to form the tongue or blade 3.

The clamp-like device according to the invention comprises no inserted or secured part, permits a fast positioning of the elements to be fastened to the metal sheet part of a vehicle door, is clearly less expensive than that of any solution known heretofore and allows a better fastening of these elements.

The invention has been described as applied to the fastening of electric cable or wiring harnesses upon a back door of an automotive vehicle but it is obvious that it is also applicable to the fastening of any other element (piping, etc.) upon a corresponding metal sheet part of a front door or any other part of an automotive vehicle.

The invention is of course not at all limited to the embodiment described and shown herein which has been given by way of example only and it comprises all the technical equivalents of the means described as well as their combinations if they are carried out according to its gist and within the scope of the appended claims.

What is claimed is:

1. A structural component of a vehicle, the component comprising:

a vehicle body or vehicle door which is configured for load bearing and providing structural support for a portion of the vehicle; and a clamp tongue extending from the body or door and being configured and dimensioned for clamping an element between the tongue and the body or door;

wherein the panel and the tongue are of unitary construction formed from a single sheet of material and the tongue comprises a partially cut-out portion of the body or door.

2. The component of claim 1, wherein the body or door is configured for providing structural support for a portion of the vehicle independently from the tongue.

3. The component of claim 1, wherein the material is a metal.

4. The component of claim 1, wherein the tongue has a side edges that are bent away from the body or door for avoiding damage to the element during insertion and the tongue defines a substantially flat and continuous cross-section between the side edges.

5. The component of claim 4, wherein the tongue includes:

a first portion that is connected to the body or door; and a flared portion disposed on an opposite side of the tongue from the first portion;

wherein the flared portion is flared away from the body or door such that displacement of the element towards the flared portion biases the tongue away from the body or door for facilitating insertion of the element between the tongue and the body or door, the flared portion being substantially contiguous with the bent side edges.

6. The component of claim 4, wherein the tongue includes a concave accommodating-portion for clamping the element between the accommodating portion and the body or door.

7. The component of claim 1, wherein the tongue is configured for clamping an elongated element between the tongue and the body or door.

8. The component of claim 1, wherein the tongue is configured for clamping a cylindrical element between the tongue and the body or door.

9. The component of claim 1, wherein the tongue is configured for clamping between the tongue and the body or door an element selected from the group consisting of an electrical-cable harness and a piping element.

10. The component of claim 1, wherein the tongue is disposed at a distance from any outer edges of the sheet.

11. A method for providing a clamp on a vehicle body or door panel, the method comprising:

forming the vehicle body or door from a sheet of material to a configuration for load bearing and providing structural support for a portion of a vehicle;

shaping a section of the body or door to a configuration for clamping an element between the section and the body or door, the section being shaped to define a clamp tongue; and partially cutting out the section from the body or door such that the section remains connected thereto.

12. The method of claim 11, wherein the steps of cutting and shaping the tongue are performed simultaneously.

13. The method of claim 11, wherein partially cutting out the section from the body or door comprises stamping the body or door.

14. The method of claim 11, wherein shaping the section comprises deforming at least a portion of the section away from the body or door.

15. The method of claim 11, wherein the body or door is formed to define a vehicle door panel.

16. A method for providing a clamp on a vehicle body or door panel, the method comprising:

forming the vehicle body or door from a sheet of material to a configuration for load bearing and providing structural support for a portion of a vehicle; and shaping a section of the body or door to a configuration for clamping an element between the section and the body or door, the section being shaped to define a clamp tongue, by punching the tongue with a tool having substantially the configuration of the tongue for clamping the element.

17. A method of securing a cylindrical element to a vehicle body or vehicle door comprising:

providing a clamp in the body or door by:

forming a vehicle body or vehicle door from a sheet of material to a configuration for providing structural support for a portion of a vehicle, shaping a section of the body or door to a configuration for clamping the element between the section and the body or door, the section being shaped to define a clamp tongue, and partially cutting out the section from the body or door such that the section remains connected thereto; and placing the cylindrical element between the clamp tongue and the body or door.

* * * * *

UNITED STATES PATENT AND TRADEMARK OFFICE
CERTIFICATE OF CORRECTION

PATENT NO. : 5,911,468

DATED : June 15, 1999

INVENTOR(S) : Pierre LE DÛ

It is certified that error appears in the above-identified patent and that said Letters Patent is hereby corrected as shown below:

TITLE PAGE, Column 2, Section [56] References Cited

After line 8, (5,092,647) insert the following:

| | | | |
|---|---|---|---|
| --5,446,036 | 11/1995 | Stroeters et al. | 296/208 |
| 5,588,260 | 12/1996 | Suzuki et al. | 296/208 X |
| 5,678,877 | 10/1997 | Nishijima et al. | 296/208 X |
| 5,716,044 | 2/1998 | Peterson et al. | 296/152 X--. |

Signed and Sealed this

Twenty-third Day of November, 1999

*Attest:*

Q. TODD DICKINSON

*Attesting Officer*    *Acting Commissioner of Patents and Trademarks*